United States Patent [19]

Northman et al.

[11] Patent Number: 4,783,049

[45] Date of Patent: Nov. 8, 1988

[54] ELECTRICALLY OPERATED AUTOMATIC TRANSMISSION CONTROLLER ASSEMBLY

[75] Inventors: Bradley L. Northman, Southfield; Michael Slavin, Troy; Donald J. West, Warren, all of Mich.

[73] Assignee: Lectron Products, Inc., Rochester Hills, Mich.

[21] Appl. No.: 37,467

[22] Filed: Apr. 13, 1987

Related U.S. Application Data

[62] Division of Ser. No. 843,164, Mar. 24, 1986, Pat. No. 4,678,006.

[51] Int. Cl.⁴ .................... F15B 13/044; F16K 31/06
[52] U.S. Cl. ......................... 251/129.14; 137/625.65; 251/129.15; 335/261
[58] Field of Search ............. 137/625.65; 251/129.14, 251/129.15, 129.16; 335/255, 261, 279

[56] References Cited

U.S. PATENT DOCUMENTS

| | | | |
|---|---|---|---|
| 3,395,890 | 8/1968 | Eckert et al. | 137/625.65 X |
| 4,281,685 | 8/1981 | Uemura | 281/129.15 X |
| 4,390,158 | 6/1983 | Lang | 251/129.15 X |
| 4,501,299 | 2/1985 | Klimowicz et al. | 136/625.65 |
| 4,578,662 | 3/1986 | Slavin et al. | 137/625.65 X |
| 4,633,209 | 12/1986 | Belbel et al. | 335/261 |

FOREIGN PATENT DOCUMENTS 2124484 11/1972 Fed. Rep. of Germany ........................ 137/628.65

264556 6/1970 U.S.S.R. ............... 335/255

Primary Examiner—Gerald A. Michalsky
Attorney, Agent, or Firm—Harness, Dickey & Pierce

[57] ABSTRACT

An electronic automatic transmission controller is provided which is adapted to enable electrical control over automatic transmission devices of the type typically used in motor vehicles. The controller employs a manifold having a number of solenoid valve assemblies mounted thereto. The solenoid valve assemblies feature a low stacked height achieved through the configuration of the valves and various improvements in force output for the solenoid valve assemblies. The solenoid valve assemblies are held in an assembled condition through the action of a bracket assembly which has resiliently deflectable arms which bias against the valve assemblies. Preferably, non-removable fasteners are employed to affix the bracket to the manifold to prevent unauthorized attempts at servicing. The solenoid valve assemblies have protruding terminals which enable a circuit board to be laid against the solenoid valve assemblies such that the board is soldered along a surface opposite the valve assemblies. The automatic transmission controller further features a design which permits automated assembly, thus reducing costs of fabrication. In addition, various improvements in solenoid design are described including a dual working gap system and a design which enables control over spring biasing of a solenoid armature and air gap distance.

4 Claims, 7 Drawing Sheets

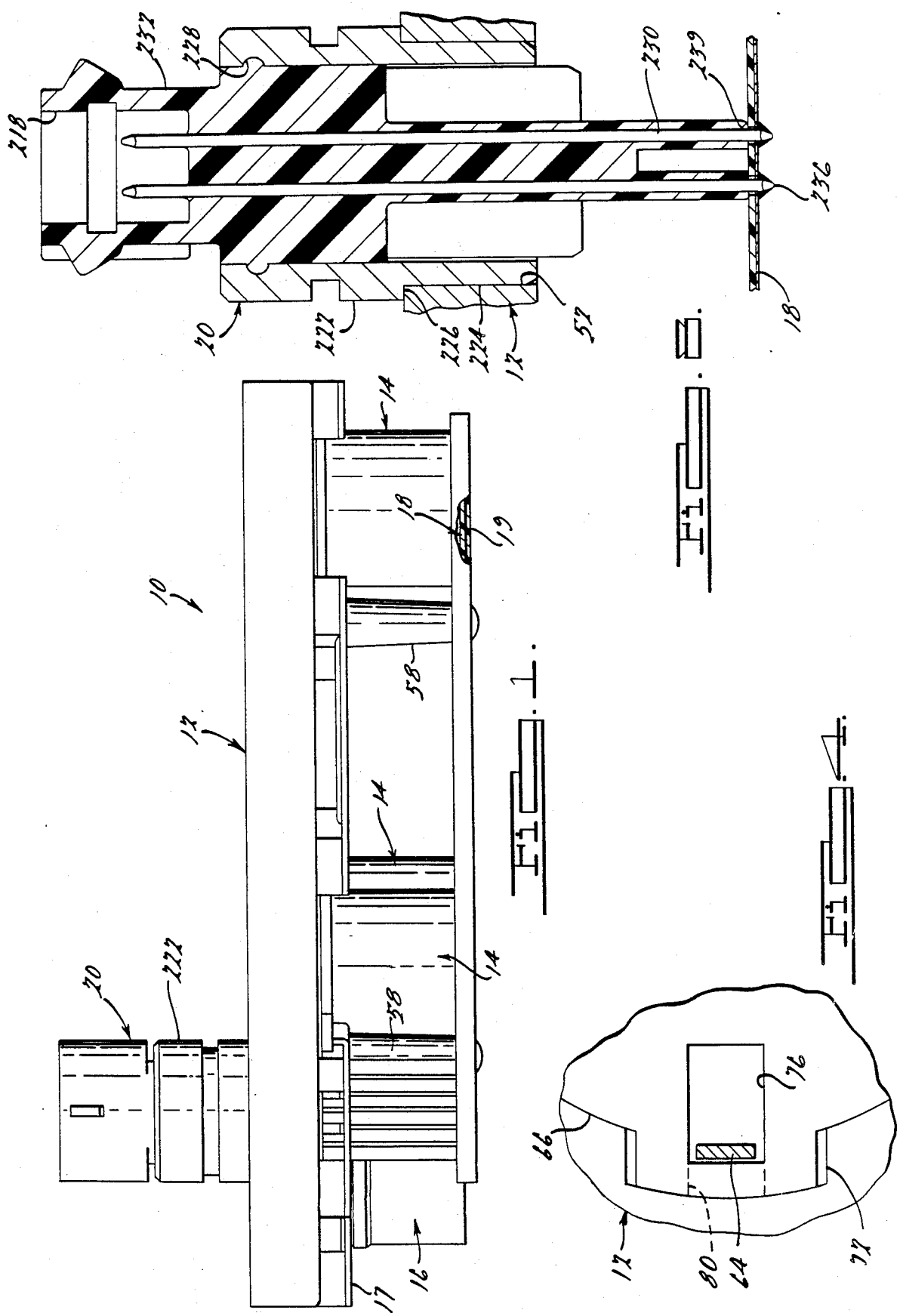

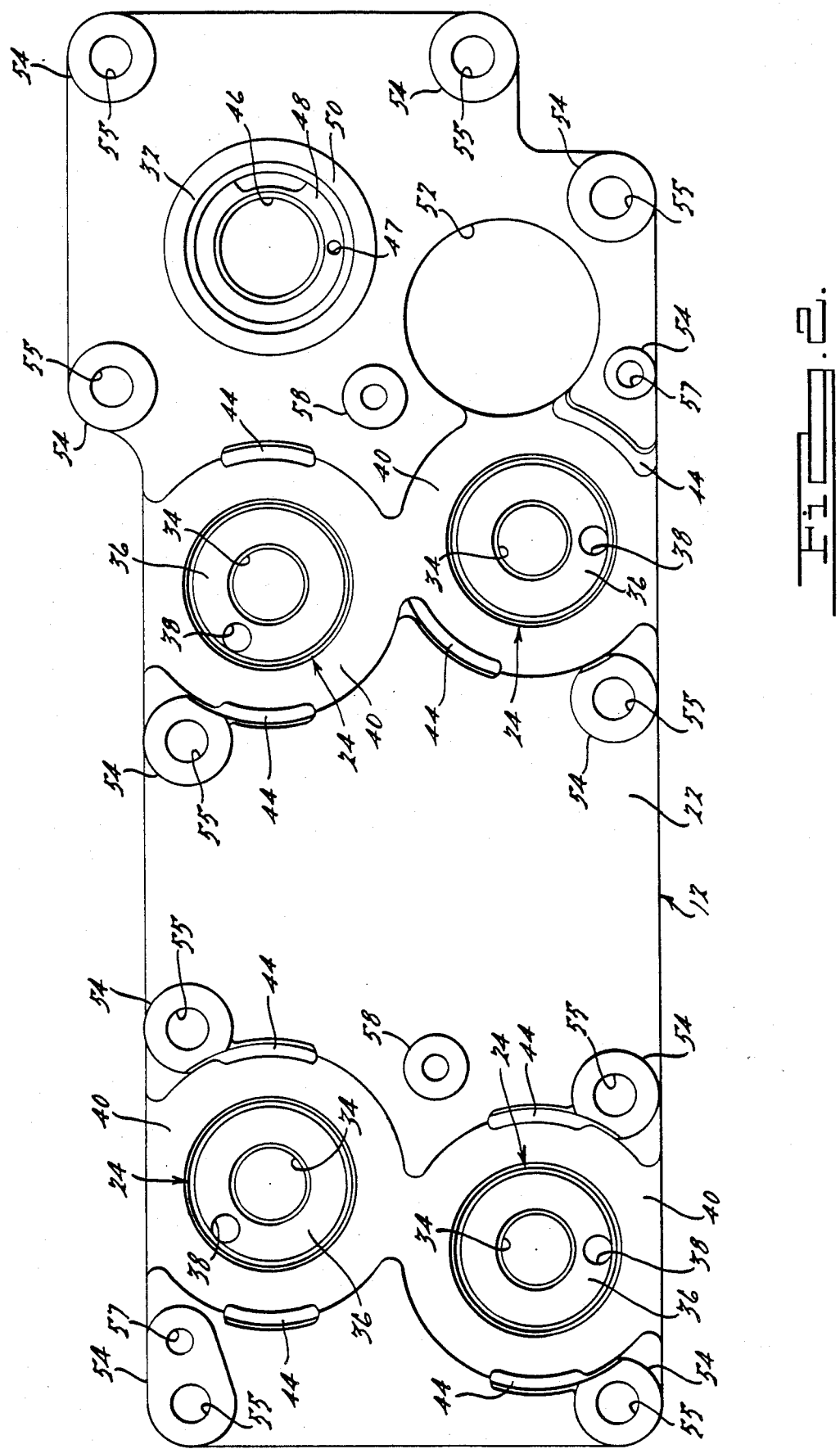

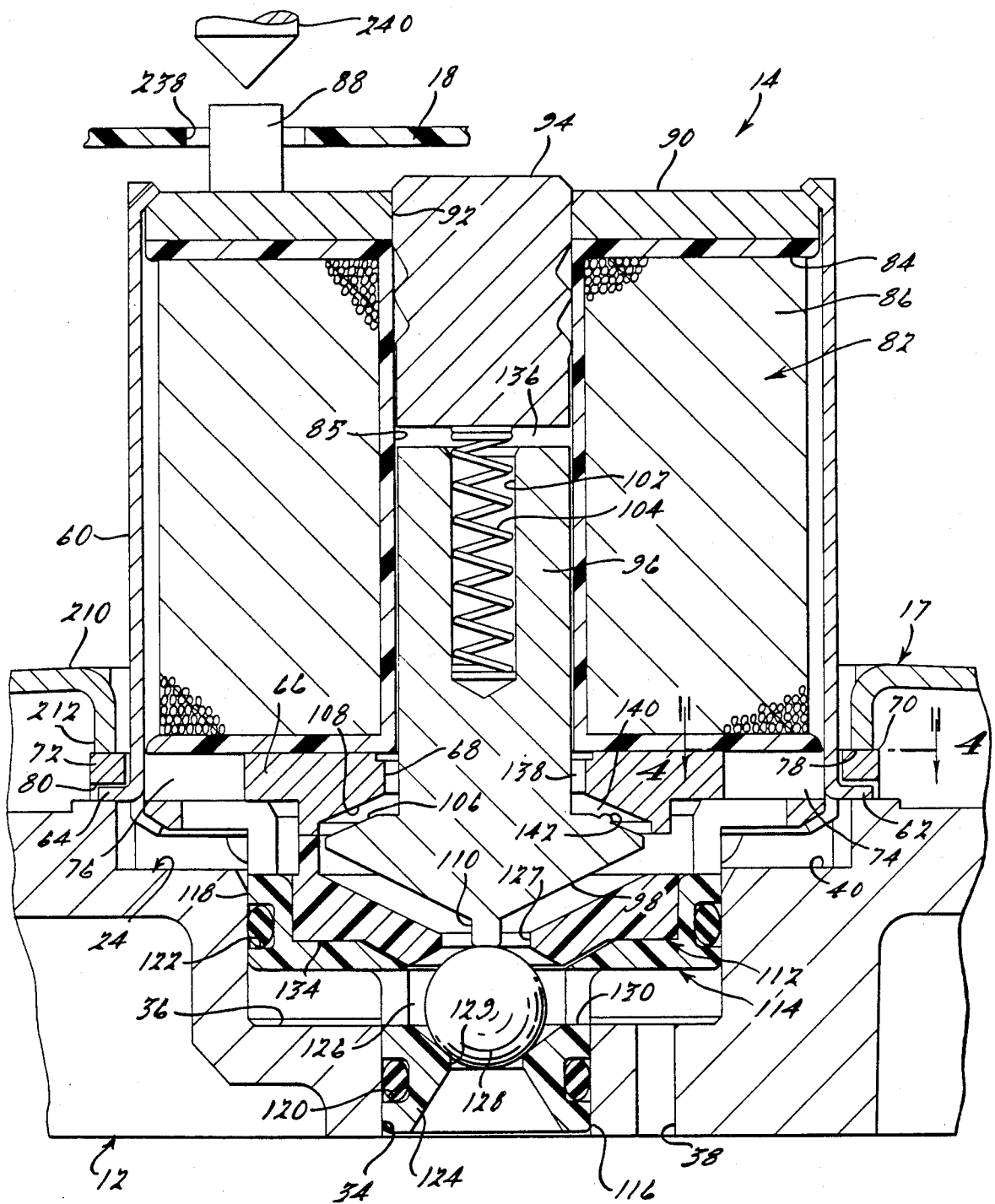

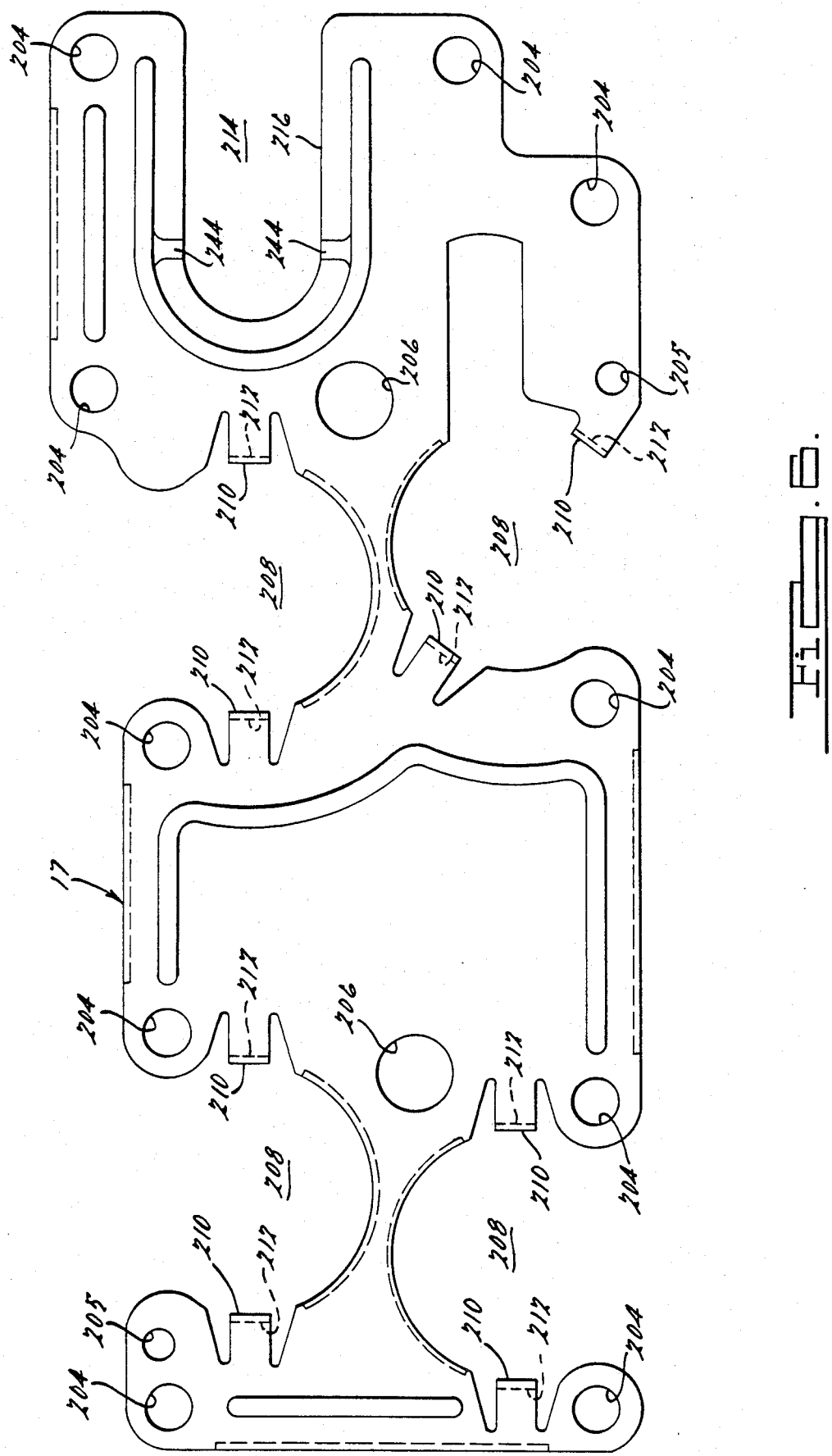

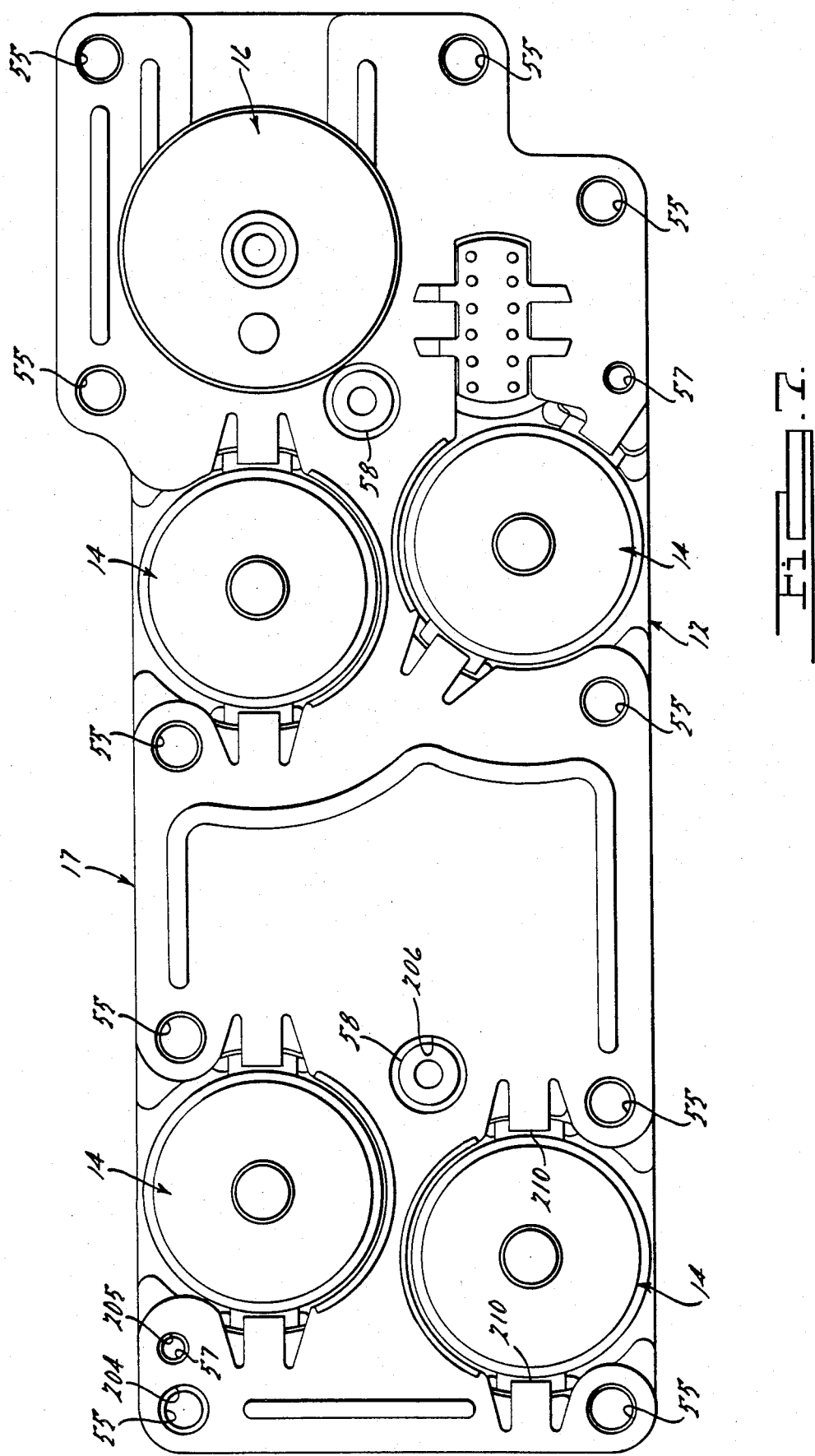

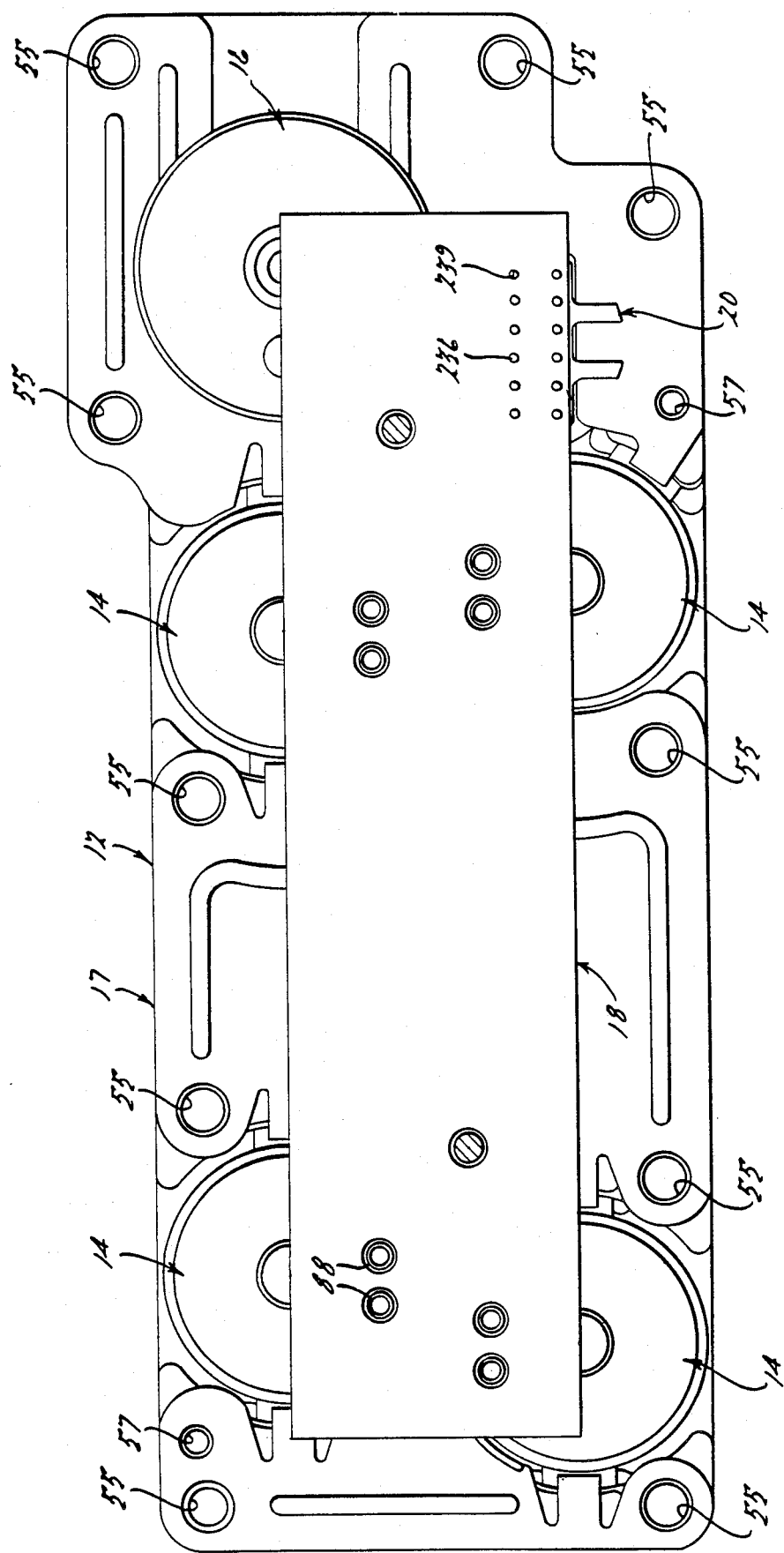

ELECTRICALLY OPERATED AUTOMATIC TRANSMISSION CONTROLLER ASSEMBLY

This is a division of United States patent application Ser. No. 843,164, filed Mar. 24, 1986, entitled, "Electrically Operated Automatic Transmission Controller Assembly", now U.S. Pat. No. 4,678,006.

BACKGROUND OF THE INVENTION

This invention relates to a fluid control device, and particularly to such a device adapted for controlling operation of a motor vehicle automatic transmission.

In the past, automatic transmissions used in motor vehicles were typically controlled through fluidic control systems incorporating numerous piston and cylinder assemblies. Although such devices operate satisfactorily, they have several drawbacks including high cost attributable to the high precision necessary in machining the components and the necessity of providing and assembling numerous components. Further, such systems are restricted in their operational capabilities. Modern motor vehicles are incorporating increasing numbers of electronically controlled subsystems and particular attention is presently being directed toward designing electronically controlled automatic transmission controllers. This invention relates specifically to such a control device.

A number of significant design challenges are presented in designing an electronically operated transmission controller. Due to the fact that such controllers would typically be located within the oil sump region of the automatic transmission, the overall height of the assembly must be limited in order to provide acceptable vehicle ground clearance and to otherwise facilitate packaging of the various transmission components. It is further desirable to provide such a device which is resistant to tampering to prevent unqualified individuals from undertaking servicing operations. As with any device intended for mass production, manufacturing cost is of extreme importance. Cost advantages can be obtained through devices which are capable of being assembled using automatic machinery. Furthermore, cost savings are realized when the components of the system are not required to be manufactured with high dimensional precision. Accordingly, it is desirable to provide a transmission controller capable of being assembled automatically and which is made from components having minimal tolerance requirements.

SUMMARY OF THE INVENTION

The present invention utilizes solenoid operated valves for controlling flow of transmission fluid which are preferably operated by a digital control system. The solenoid valves are mounted as a subassembly on a common manifold; the arrangement is such that the subassembly can be mounted as a unit to the transmission case of a motor vehicle.

The unitary subassembly construction of the present invention facilitates manufacture of the subassembly, and accordingly, minimizes cost. To this end, the components of the subassembly are correlated in a manner that facilitates automation of the various operations required in the manufacture of the subassembly. Moreover, the components of the subassembly are assembled in such a way as to prevent tampering by persons who might not know the essential values and requirements of the components that might require replacement, and as a result, unjustly expose the original manufacturer of the transmission or of the associated vehicle to warranty obligations and expenses. In this connection, it is desirable, both from the standpoint of the manufacturer and of the customer, that the subassembly be replaced as a whole if service of any component thereof is necessary or desirable and that the subassembly be returned to the manufacturer or supplier for proper servicing.

Another advantage of the controller according to this invention is that it permits the maximum use of molded plastic parts and this has the further advantage of reducing or minimizing the cost of manufacture. The manifold plate on which the solenoid valves are mounted is preferably made of metal while some of the valve assembly components of the solenoid valves ideally are made of plastic by conventinal injection molding processes. In practice, according to the present invention, flow of transmission fluid through the flow ducts in the transmission is controlled by solenoid operated valves which are mounted on the side of the manifold opposite the surface which mounts to the transmission. In practice, the manifold is mounted in the pan or oil sump at the bottom of the transmission with the manifold seated upwardly against and bolted or otherwise fastened to the transmission case at the top of the sump. In this environment, the solenoid valves extend downwardly into the sump and are submerged or at least partially submerged in transmission fluid.

A requirement for a low vertical height of the controller assembly imposes extreme demands in the design of the solenoid operated valves since it is difficult to design high force output valves which are also very compact. Additionally, since the device is intended to control the flow of fluids, the elements must be capable of handling the desired pressures and flow rates of such fluid. These design parameters are achieved in accordance with this invention through the use of high force output solenoids. One described embodiment of such a solenoid operated valve includes a dual working air gap feature which enables high force output to be provided with low solenoid stacking height. Packaging space reductions are further realized by mounting a printed circuit board which contains the connection points for the various solenoids and connectors directly onto one end of the solenoid valve assemblies. Cost reductions attributable to reductions in tolerance requirements are achieved in accordance with this invention by employing a system for mounting the solenoid operated valves against the associated manifold using a bracket plate having deflectable spring fingers which resiliently bias the valves into their mounting ports. Excellent fluid flow characteristics are provided by designing the valve elements of the solenoid operated valves such that they provide tapered orifices which reduce the tendency for high frequency oscillations and eddies from being generated during fluid flow through the valve and increase cold temperature flow by reducing viscous losses.

Additional benefits and advantages of the present invention will become apparent to those skilled in the art to which this invention relates from the subsequent description of the preferred embodiments and the appended claims, taken in conjunction with the accompanying drawings.

DESCRIPTION OF THE DRAWINGS

FIG. 1 is a side elevational view of an automatic transmission controller assembly in accordance with this invention showing the device completely assembled;

FIG. 2 is a bottom view of the manifold in accordance with this invention;

FIG. 3 is a cross-sectional view through one of the ON/OFF solenoid valve assemblies in accordance with this invention;

FIG. 4 is a partial sectional view taken along lines 4—4 of FIG. 3 showing the assembly of the housing and flux collector components;

FIG. 6 is a bottom view of the solenoid valve assembly mounting bracket in accordance with this invention;

FIG. 7 is a bottom view of the assembly of the manifold, solenoid valves and bracket shown in FIGS. 2 and 6;

FIG. 8 is a cross-sectional view taken along lines 8-8 of FIG. 1 showing the internal details of the electrical connector in accordance with this invention; and FIG. 9 is a top view of a transmission controller assembly according to this invention particularly showing the circuit board component as installed on the assembly.

DETAILED DESCRIPTION OF THE INVENTION

Figure 5:
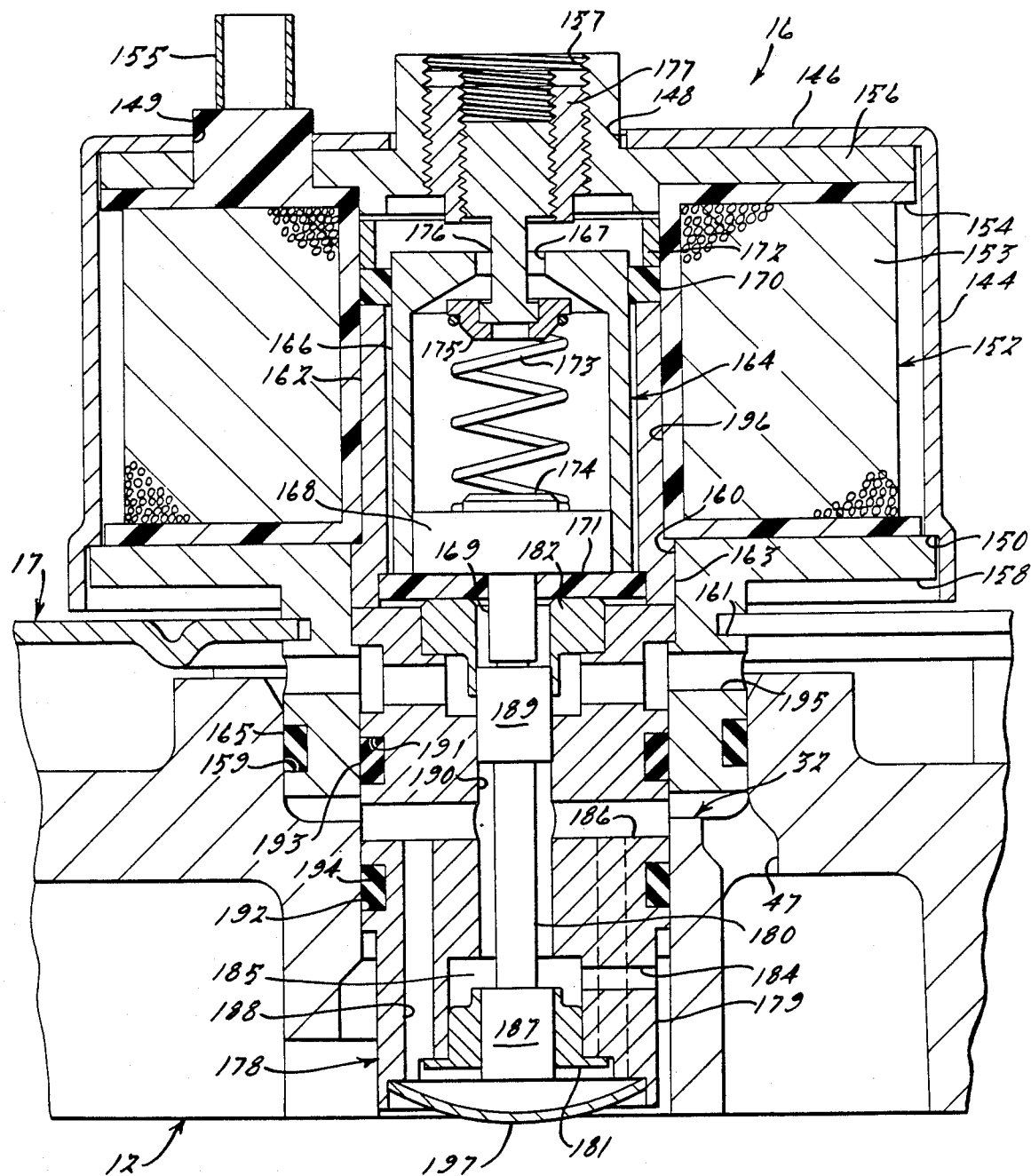
FIG. 5 is a cross-sectional view through the variable force solenoid valve assembly in accordance with this invention.

An electronic automatic transmission controller assembly in accordance with this invention is shown fully assembled in FIG. 1 and is generally designated there by reference number 10. Controller 10 principally comprises manifold 12, a plurality of ON/OFF solenoid valve assemblies 14, variable force solenoid valve assembly 16 (optional), bracket 17, PC board 18, and electrical connector 20. In use, automatic transmission controller 10 would be affixed to an automatic transmission device and disposed in the oil sump chamber of such a transmission. The normal mounting orientation of controller 10 is shown in FIG. 1 with PC board 18 or protective cover 19 defining the lowermost portion of the controller. In operation, solenoid valve assemblies 14 and 16 would receive electrical signal inputs from a remote electronic controller device which would cause the valve assemblies to change fluid pressures within various flow channels of the transmission to thereby cause the transmission to undergo shifting changes, etc. The associated transmission structure would be configured to permit electrical connector 20 to be exposed to the exterior of the transmission to permit an associated electrical connector to be attached thereto.

FIG. 2 provides an illustration of some of the details of manifold 12. Manifold 12 is preferably formed from a metal through die casting and/or machining processes. Manifold 12 has a lower surface 22 defining a plurality of ON/OFF solenoid valve assembly mounting ports 24. FIG. 2 shows four of such ports although other numbers may be used, depending on the particular application. Each of ports 24 defines a central bore 34, an annular surface 36 concentrically encircling bore 34, and flow port 38. An additional planar surface 40 surrounds the ports and is displaced from the plane of lower surface 22. Each of ports 24 further defines a pair of pads 44. Mounting port 32 is configured to receive variable force solenoid valve assembly 16. Port 32 for variable force solenoid valve assembly 16 similarly includes a central port 46, flow port 47, and concentric surfaces 48 and 50. The solenoid valve ports 34 and 38 communicate with fluid channels in the main transmission case. Ports 46 and 47 communicate with various fluid flow channels defined by the side of manifold 12 opposite surface 22. The manifold flow channels communicate with associate flow ducts in the automatic transmission (not shown). Manifold bore 52 provides a mounting orifice for electrical connector 20. Manifold 12 further includes a pair of upstanding posts 58 having central blind threaded bores and a plurality of upstanding mounting posts 54 located around the peripheral edges of the manifold edges. Posts 54 have a shorter axial length than posts 58 and define bores 55 which pass through the manifold, and include blind threaded bores 57.

FIG. 3 provides a detailed view of the internal components of ON/OFF solenoid valve assembly 14. ON/OFF solenoid assembly 14 is enclosed by a generally cylindrical housing 60 having a lower surface with a pair of opposed extending tabs 62 and 64. Flux collector plate 66 is made from a magnetic material and is generally circular with a central bore 68 and a pair of extending flange portions 70 and 72. As best shown in FIG. 4, flange portions 70 and 72 further define slots 74 and 76. A pair of recessed notches 78 and 80 extend from slots 74 and 76 in a radially outward direction as shown in FIGS. 3 and 4. When assembled, housing 60 is located such that tabs 62 and 64 are inserted through slots 74 and 76. Thereafter, tabs 62 and 64 are deformed in a radially outward direction to interlockingly engage with flux collector plate 66. The remaining portions of the lower circular edge of housing 60 are deformed in a radially inward direction as best shown in FIG. 3. With this construction, the lower surface of flux collector plate 66 establishes the positioning of solenoid valve assembly 14 with respect to manifold 12. Such a design has advantages over alternate designs which employ the lower surface of the housing for establishing the positioning of the solenoid valve assembly. Such alternate designs would require precise machining of the lower edge of housing 60 in order to insure accurate positioning of the solenoid valves.

Disposed within housing 60 is a generally toroidal-shaped coil assembly 82 which includes spool-shaped bobbin 84 having bore 85 along its longitudinal axis and wire coil 86. Bobbin 84 has a pair of upstanding terminal posts 88 (one shown) which are electrically connected to coil 86. The end of valve assembly 14 opposite manifold 12 is enclosed by flux collector 90 having central bore 92. Pole piece 94 is press fit into bore 92 such that it is disposed into a portion of bobbin bore 85 and remains in the stationary position following assembly.

Armature 96 is the moving actuating element within valve assembly 14. As shown, armature 96 has a generally flared end 98 and an opposite end defining a blind bore 102 with spring 104 disposed therein. Armature flared end 98 defines a conical surface 106 which is spaced from a correspondingly shaped conical surface 108 of flux collector plate 66. Armature flared end 98 further has a centrally disposed projecting pin 110.

Control of fluid flow between manifold ports 34 and 38 is accomplished through the operation of valve assembly 112 which is actuated by armature 96. Valve assembly 112 includes valve body 114 which defines two cylindrical surfaces 116 and 118 with annular seal grooves 120 and 122. Valve body 114 further forms a central tapered orifice 124. Exhaust plate 134 is installed within valve body 114 to define internal chamber 126 which confines valve ball 128. Chamber 126 opens to a pair of ports 127 and 129 formed by exhaust plate 134 and valve body 114, respectively. Valve ball 128 is movable within chamber 126 to selectively control fluid flow through ports 127 and 129. Valve body 114 has one or more radially extending orifices 130 communicating with chamber 126.

Operation of ON/OFF solenoid valve assembly 14 will now be explained with particular reference to FIG. 3. Solenoid valve assembly 14 is energized by passing electrical current through coil 86. The resulting magnetic field is transmitted through pole piece 94, armature 96, flux collector plate 66, housing 60 and flux collector 90. When this occurs, the surfaces defining the air gaps within the magnetic circuit are caused to be attracted to one another due to their opposite magnetic poles. In accordance with one feature of this invention, armature 96 and the corresponding components define two separate working air gaps which generate forces urging armature 96 to translate within bore 85. Air gap 136 is defined by the interface between armature 96 and pole piece 94. In accordance with conventional practices, the other air gap which would be necessary to transfer magnetic fields to armature 96 would be comprised of a radially extending gap such as gap 138 defined by separated cylindrical surfaces of armature 96 and bore 68 of flux collector plate 66. Such radially extending air gaps do not produce an attracting force which urges armature 96 to move, but are ordinarily necessary in order to provide a conduction path for the magnetic fields generated by current flow through coil 86. However, these inventors have found that by designing a second air gap having surfaces which are not truly cylindrical, additional attracting forces can be generated which augment the force applied on armature 96, thus enabling higher force output solenoids to be provided. In accordance with one feature of this invention, the tapered surfaces 106 and 108 define such a secondary air gap 140. Lines of force which act in a direction generally perpendicular to these surfaces have a component in the direction of linear movement of armature 96, and therefore add to the useful operating forces exerted on the armature. Surfaces 106 and 108 are tapered such that the distance between them does not increase as much as the distance of linear motion of armature 96. By limiting such separation distance, attracting forces can be developed over long armature travel. When using such non-cylindrical air gaps, it is desirable to eliminate small distance cylindrical air gaps which could result in magnetic losses in the system.

In accordance with another feature of this invention, a plurality of small local bumps or projections 142 may be provided on either of the surfaces of either air gap 136 or 140 (as shown). During operation of valve assembly 14, these projections 142 would be designed to make direct contact with the corresponding opposing surface of that air gap. By permitting such contact, the air gap separation distance for the remaining surfaces can be accurately established. In solenoid design, it is usually necessary to control the minimum air gap distance since the attraction force between the surfaces of an air gap for a given current flow increases exponentially with decreased air gap distance. When separation distances become extremely small, a change in state of the solenoid valve assembly following de-energization becomes less reliable if any residual magnetism is present when no electrical current is flowing through the coil. Although projections 142 make contact with the corresponding air gap surface and would consequently constitute a very small air gap, their areas are very small, thus limiting the total forces which can be applied by these features.

FIG. 3 illustrates solenoid valve assembly 14 in a de-energized state. In this condition, the biasing force exerted by spring 104 through armature 96 urges valve ball 128 into sealing engagement with port 129 which blocks the flow of fluid between that port and orifice 130. In this position, fluid communication is established between ports 127 and 130, thus providing a pressure vent for the fluid circuit associated with port 38 of manifold 12. Spring 104 is selected and preloaded to exert a sufficient force to prevent unseating of ball 128 when orifice 124 is exposed to given maximum fluid pressure, for example, 130 psi. When current is caused to flow through coil 86, thus energizing the solenoid assembly, armature 96 is attracted in a direction toward pole piece 94 to the degree that the force exerted by spring 104 is overcome, enabling the armature to translate upwardly. Such movement of armature 96 permits ball 128 to be unseated from port 129 and instead becomes seated against port 127 due to the pressure of fluid flowing through port 129. In this condition, fluid communication is established between tapered orifice 124 and radially extending bores 130.

FIG. 5 provides a detailed illustration of the internal working components of variable force solenoid valve assembly 16. Variable force solenoid valve assembly 16 is enclosed by housing 144 having a generally closed end 146 with central bore 148 and terminal bore 149. The opposite end of housing 144 is opened and defines annular shoulder 150, such that the housing is slightly flared at that end. Disposed within housing 144 is coil assembly 152 comprised of coil 153 and spool-shaped bobbin 154. Coil 153 is electrically connected to a pair of upstanding terminals 155 (one shown) which extend through housing bore 149. Flux collector 156 is positioned at one end of coil assembly 152 and forms a central threaded bore 157. At the opposite end of coil assembly 152, flux collector 158 is provided with central bore 160 and external annular groove 161. Following assembly, the lower edge of housing 144 is deflected inwardly to interlock with flux collector 156. Coil assembly 152 defines a central bore 196. Tubular insert 162 is disposed within the coil assembly bore and has a radially outwardly extending end 163. Armature assembly 164 is positioned within the coil assembly bore such that it can translate therein. Armature assembly 164 is a composite structure made from tube portion 166 which has an open end and a generally closed opposite end having a central bore 167. Armature insert 168 is a generally disc shaped member having an upstanding central pin 169 and has an outer diameter which provides an interference fit with the inside diameter of tube 166. Energization of coil 153 produces a force on armature assembly 168 urging it to move in an upward direction, with reference to the orientation of the elements shown in FIG. 5. This action occurs through a magnetic conduction path in which magnetic fields are transferred through flux collector 156, armature assembly 164, flux collector 158 and housing 144, thereby providing a working air gap between the end of tube 166 and flux collector plate 156. Armature assembly 164 is guided to remain in a desired aligned positioning within bore 196 of tubular insert 162 through the guiding action provided by guide bushings 170 and 171, which are made of a non-magnetic material which is stable over a wide temperature range. Guide bushing 170 is maintained in position through clamping engagement between tube 162 and spacer guide 172. Guide bushings 170 and 171 provide a low friction means of supporting armature assembly 164 for axial movement without employing costly precision linear ball bearings.

Variable force solenoid valve assembly 16 includes a mechanism for providing an adjustable compliant loading onto armature assembly 164 which opposes forces imposed through energization of coil 153. This mechanism includes coil spring 173 disposed within tube 166 which rests on spring post 174. The opposite end of coil spring 173 rests on spring seat 175 which is positioned on headed pin 176. Headed pin 176 includes a portion having a threaded external surface which threadingly engages adjuster sleeve 177, which in turn is threaded into threaded bore 157 of flux collector 156. By changing the positioning of pin 176, a variation in the biasing force exerted by spring 173 is provided by changing the amount of compression of the spring. Adjustment sleeve 177, on the other hand, provides a stop surface which permits control over the minimum distance of the air gap between armature tube 166 and flux collector 156. As previously explained, direct contact or excessively small air gap distances should be avoided since they can cause great difficulty in controlling forces acting on the armature.

The fluid control components associated with variable force solenoid 16 are disposed within manifold solenoid mounting port 32. Variable force solenoid 16 is provided with controller 10 to enable control over fluid pressures to be provided in response to a current input signal to coil 153. Such control is achieved by selectively reducing the pressure of fluid at inlet pressure to a control pressure by restricting fluid flow and through venting fluid to the transmission sump. Valve assembly 178 is disposed within port 46, and is primarily composed of valve body 179, spool valve 180, and inserts 181 and 182. Valve body 179 defines a plurality of radially extending inlet ports 184 which communicate from the external surface of valve body 179 to internal chamber 185 which are exposed to fluid at inlet pressure. Another set of radially extending passages 186 are provided which conduct fluid at control pressure. The external end of spool valve head 187 is exposed to control pressure through passages 188. Cap 197 encloses the space at the lower end of valve assembly 178. The opposite end of spool valve 180 defines spool valve head 189 which moves within central bore 190 of the valve body. Pin 169 of armature insert 168 abuts spool valve head 189 which enables pin 169 to transmit forces against head 189 while enabling valve 180 and armature assembly 164 to be decoupled so that any misalignment in their longitudinal axes will not cause the components to bind as they translate. The external surface of valve body 179 includes grooves 191 and 192 having seals 193 and 194 disposed therein. Flux collector 156 defines groove 159 having seal 165 disposed therin. This arrangement provides separated fluid passages wherein inlet pressure is provided via inlet port 184 and control pressure is provided through passages 186 and 188 and through bore 47 of the manifold. Fluid can be vented from the unit into the sump passage through port 195.

Operation of variable force solenoid valve 16 will now be explained with reference to FIG. 5. Fluid at inlet pressure is provided through port 184 and into chamber 185. This fluid is permitted to flow along spool valve 180, through bore 190, passages 186 and 188, and therefore becomes exposed to the lower end of head 187. This action causes a resultant force to act on spool element 180, which urges it in an upward direction to a point where the force exerted by spring 173 and the fluid pressure acting on head 187 are balanced. Preferably, in the absence of current flow through coil 153, such force balancing causes spool valve 180 to be displaced upwardly to impose a fluid flow restriction between valve head 187 and bore 190. This restriction, together with fluid leakage which is intentionally permitted between head 189 and bore 190 to the sump (at about atmospheric pressure) will provide a regulated control pressure at some predetermined level, for example, 90 psi when the inlet pressure is about 100 psi. Modulation over the control pressure is provided by selectively energizing coil 153. A given level of current through the coil will cause a magnetic force to be applied onto armature assembly 164 urging it in an upward direction, which is opposed by the force imposed by spring 173 aided by the pressure force on head 187. This action has the effect of unbalancing the above-described equilibrium. The resultant force causes armature assembly 164 and spool valve 180 to move in an upward direction and seek a new equilibrium condition. Such action further restricts the flow passage between head 187 and bore 190 and simultaneously reduces the restriction of flow between fluid control pressure and the sump between head 189 and port 190 since the extent of overlap between the bore and head 189 becomes reduced. Accordingly, controlled energization of coil 153 enables the pressure of the control pressure to be reduced from the non-energized equilibrium control pressure in a desired manner.

During initial assembly and calibration, fluid at inlet pressure is applied through port 184 to the terminal end of head 187 and headed pin 176 is rotated until the compliant load provided by spring 173 produces a desired control pressure. Next, a voltage signal is applied to coil 153 to provide a predetermined current and the control pressure is monitored as adjustment sleeve 176 is rotated to produce a predetermined control pressure which occurs when a desired air gap distance exists between flux collector 156 and armature assembly 164.

During assembly, ON/OFF solenoid valve assemblies 14 and variable force solenoid assembly 16 are inserted into mounting ports 24 and 32 of manifold 12. Bracket 17 is used to support the solenoid valve assemblies. Bracket 17 is best shown with reference to FIG. 6 and includes a plurality of holes 204 and 205 for manifold bores 55 and 57, respectively. Apertures 206 provide clearance for posts 58. Bracket 17 defines four solenoid valve assembly receiving areas 208 for clearance for ON/OFF solenoid valve assemblies 14, and includes a pair of diametrically opposed solenoid valve retaining fingers 210 which become positioned over manifold pads 44. The end portions of retaining fingers 210 are deformed downwardly to define tabs 212. Bracket 17 features another valve retaining area 214 for variable force solenoid valve 16. Retaining area 214 is formed by an elongated slot 216. Variable force solenoid valve 16 is loaded into slot 216 by sliding valve groove 161 into the slot.

FIG. 7 shows the previously described components assembled. Solenoid valve assemblies 14 are loaded into the mounting ports 24 and bracket 17 is dropped over them. If variable force solenoid 16 is to be used, it is loaded into bracket slot 216. One or more fasteners are provided which pass through bracket holes 204 and engage threaded manifold bores 57 to retain the subassembly together. Preferably, such fasteners would be of the so-called "break-away or torque-off" variety, having a driving head which shears apart from the remainder of the fastener when a given applied torque is reached, thus preventing the fastener from being easily removed later. As previously explained, it is desirable to prevent unauthorized servicing of this device, and the use of such fasteners effectively discourages individuals without special equipment from attempting component repairs themselves. When controller 10 is mounted to the associated transmission structure, threaded fasteners are disposed through bracket holes 204 and manifold bores 55. The use of such fasteners securely clamps together bracket 17 and manifold 12. Bracket retaining fingers 212 are designed to deflect slightly such that they exert a constant clamping force on the solenoid valve assemblies, thus maintaining them in their installed position precluding relative motion with manifold 12 which would tend to wear the seal elements associated with the valve assemblies. Spring fingers 212 may be designed to permanently deform to eliminate high tolerance requirements and to guarantee hold down force simultaneously at all points. Raised areas 244 adjacent bracket slot 216 provide an interference fit with groove 161 to control vibration and pressure induced movement of solenoid valve 16 which would tend to wear seals 165 and 194.

Now with reference to FIG. 8, electrical connector 20 is shown in detail. Connector 20 is preferably comprised of tubular outer sleeve 222 which has a reduced diameter section 224 exterior shoulder 226. Sleeve section 224 is dimensioned to be inserted into manifold bore 52. The inside surface of sleeve 222 includes a radially outwardly extending annular groove 228. In a preferred construction of connector 20, sleeve 222 is loaded into an injection molding die and a plurality of conductors 230 are disposed therein. Next, flowable resin material is injected into sleeve 222 to define conductor body 232. Once molded, conductor body 232 has conductors 230 projecting from one end and forms a male connector receiving cavity 218. Groove 228 insures that the conductor body 232 interlockingly engages sleeve 222. Once loaded into bore 52, the extending post portions 236 of connector 20 lie in the plane of the end surfaces of solenoid valve assemblies 14 and 16. The above described configuration permits PC board 18 to be loaded onto that plane such that all the electrical terminals extend through holes 239 in the PC board. In this manner, PC board 18 can be automatically soldered using wave soldering techniques which involves passing the assembly with the PC board faced in a downward orientation over a wave of molten solder which adheres to the exposed metal surfaces of the PC board and terminals.

PC board 18 is illustrated in simplified form in FIG. 9 which shows holes in the board for terminals of the solenoid valves 14 and 16 and connector 20. In practice, board 18 would have a conductive layer which is etched in a manner to provide the desired connections between the various terminals. In addition, PC board 18 may further provide conduction paths and mounting provisions for diodes for each solenoid valve which are used to suppress solenoid induced voltage spikes.

In accordance with another feature of this invention, loading and soldering of PC board 18 onto the assembly is facilitated. If the holes through PC board 18 for electrical terminals 88 are small in relation to the cross-sectional area of the terminals, precise positioning of the components is necessary in order to load the PC board in place. Unfortunately, it is ordinarily necessary to avoid large gaps between a circuit board soldering surfaces and the associated electrical terminals in order to insure an electrically and mechanically secure connections. In accordance with this invention, as shown in FIGS. 3 and 5, electrical terminals 88 of solenoid valve assemblies 14 and 16 may be conformed in a tubular shape. The outer diameter of the tube is significantly smaller than the inside diameter of bores 238 in PC board 18. Such clearance facilitates fabrication by reducing the tolerance requirements for positioning of the components. After PC board 18 is loaded into position, a conical-shaped tool 240 is depressed within the inside cavity of the terminal post to cause it to become flared, thus interlocking the terminal with the PC board and bringing the terminal close to the PC board soldering surfaces. In addition to facilitating assembly, this technique also improves the mechanical engagement between PC board 18 and the electrical terminals of the various components. Such mechanical interengagement is particularly important since controller 10 is intended to be used in a harsh vibrational environment. Pins 236 of electrical connector 20 are preferably deflected to mechanically engage PC board 18. With this arrangement, electrical connector 20 is prevented from being withdrawn from bore 52 due to interlocking with PC board 18, and cannot be further inserted into the bore due to the engagement of shoulder 226 with manifold 12.

PC board 18 is mechanically connected to manifold 12 by fasteners threaded into bores of posts 58 to improve vibration reliability and ruggedness for installation handling. Such fasteners could be conventional types or of the "break-away or torque-off" variety previously described to discourage tampering. Preferably, PC board 18 is enclosed by cover 19 which snaps onto the PC board, thus protecting the electrical connections.

While the above description constitutes the preferred embodiments of the present invention, it will be appreciated that the invention is susceptible to modification, variation and change without departing from the proper scope and fair meaning of the accompanying claims.

What is claimed is:
1. A solenoid assembly, comprising:
   an energization coil defining a longitudinal bore,
   a pole means defining a generally flat first surface disposed in said bore,
   a movable armature disposed in said bore and adapted to translate in said bore along an axis in response to energization of said coil, said armature defining a generally flat second surface which confronts said first surface of said pole means, said first and second surfaces being generally perpendicular to said axis and defining a first working air gap across which magnetic fields are transferred thereby generating an attracting force between said pole means and said armature urging said armature to move in said bore along said axis, said armature further defining a conical shaped third surface,
   a flux collector plate defining a conical shaped fourth surface which confronts said armature third surface, said third and fourth surfaces defining a second working air gap across which magnetic fields are transferred thereby generating an attracting force between said flux collector plate and said armature, said attracting force having a component which acts along said axis, thereby augmenting the attracting force acting across said first air gap.

2. A solenoid assembly according to claim 1 wherein said flux collector plate defines a central bore through which said armature moves.

3. A solenoid assembly according to claim 1 wherein at least one of said surfaces defines local projections which contact the corresponding surface to thereby control the minimum distance of either of said air gaps.

4. A solenoid assembly according to claim 1 wherein said solenoid assembly is employed to actuate a fluid control valve assembly.

* * * * *